United States Patent
Almog et al.

(10) Patent No.: US 11,483,127 B2
(45) Date of Patent: Oct. 25, 2022

(54) CLOCK SYNCHRONIZATION

(71) Applicant: MELLANOX TECHNOLOGIES, LTD., Yokneam (IL)

(72) Inventors: Ariel Almog, Kohav Yair (IL); Thomas Kernen, Russin (CH); Alex Vainman, Modiin (IL); Nir Nitzani, Tel Aviv (IL); Dotan David Levi, Kiryat Motzkin (IL); Ilan Smith, Kfar Bin Nun (IL); Rafi Wiener, Lod (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 119 days.

(21) Appl. No.: 16/683,309

(22) Filed: Nov. 14, 2019

(65) Prior Publication Data
US 2020/0162234 A1 May 21, 2020

Related U.S. Application Data

(60) Provisional application No. 62/768,920, filed on Nov. 18, 2018.

(51) Int. Cl.
*H04L 7/10* (2006.01)
*G06F 9/455* (2018.01)

(52) U.S. Cl.
CPC ............ *H04L 7/10* (2013.01); *G06F 9/455* (2013.01)

(58) Field of Classification Search
CPC ............ G06F 9/45558; G06F 13/4221; G06F 2213/0024; G06F 2009/45583; G06F 2009/45595; G06F 9/45533; G06F 1/14; G06F 9/455; G06F 2009/45579; H04J 3/0667; H04L 7/10
See application file for complete search history.

(56) References Cited

U.S. PATENT DOCUMENTS

| | | | |
|---|---|---|---|
| 5,392,421 A | 2/1995 | Lennartsson |
| 5,402,394 A | 3/1995 | Turski |
| 5,416,808 A | 5/1995 | Witsaman et al. |
| 5,491,792 A | 2/1996 | Grisham et al. |

(Continued)

FOREIGN PATENT DOCUMENTS

| | | | |
|---|---|---|---|
| CN | 106817183 A | | 6/2017 |
| CN | 108829493 A | * | 11/2018 |

(Continued)

OTHER PUBLICATIONS

Weibel, H., "High Precision Clock Synchronization according to IEEE 1588 Implementation and Performance Issues", Zurich University of Applied Sciences, pp. 1-9, Jan. 17, 2005.

(Continued)

*Primary Examiner* — Eyob Hagos
(74) *Attorney, Agent, or Firm* — Kligler & Associates Patent Attorneys Ltd

(57) ABSTRACT

Apparatus including a shared device in communication with a plurality of computing machines external to the shared device, the shared device including at least one PTP domain coefficient storage area, the at least one PTP domain coefficient storage area receiving a PTP coefficient from a computing machine having a PTP client, and providing the PTP coefficient to a computing machine not having a PTP client. Related apparatus and methods are also provided.

9 Claims, 4 Drawing Sheets

(56) References Cited

U.S. PATENT DOCUMENTS

| | | | |
|---|---|---|---|
| 5,564,285 | A | 10/1996 | Jurewicz et al. |
| 5,592,486 | A | 1/1997 | Lo et al. |
| 5,896,524 | A | 4/1999 | Halstead, Jr. et al. |
| 6,055,246 | A | 4/2000 | Jones |
| 6,084,856 | A | 7/2000 | Simmons et al. |
| 6,144,714 | A | 11/2000 | Bleiweiss et al. |
| 6,199,169 | B1 | 3/2001 | Voth |
| 6,289,023 | B1 | 9/2001 | Dowling et al. |
| 6,449,291 | B1 | 9/2002 | Burns et al. |
| 6,535,926 | B1 | 3/2003 | Esker |
| 6,556,638 | B1 | 4/2003 | Blackburn |
| 6,918,049 | B2 | 7/2005 | Lamb et al. |
| 7,111,184 | B2 | 9/2006 | Thomas, Jr. et al. |
| 7,191,354 | B2 | 3/2007 | Purho |
| 7,245,627 | B2 | 7/2007 | Goldenberg et al. |
| 7,254,646 | B2 | 8/2007 | Aguilera et al. |
| 7,334,124 | B2 | 2/2008 | Pham et al. |
| 7,412,475 | B1 | 8/2008 | Govindarajalu |
| 7,440,474 | B1 | 10/2008 | Goldman et al. |
| 7,447,975 | B2 | 11/2008 | Riley |
| 7,483,448 | B2 | 1/2009 | Bhandari et al. |
| 7,496,686 | B2 | 2/2009 | Coyle |
| 7,535,933 | B2 | 5/2009 | Zerbe et al. |
| 7,623,552 | B2 | 11/2009 | Jordan et al. |
| 7,636,767 | B2 | 12/2009 | Lev-Ran et al. |
| 7,650,158 | B2 | 1/2010 | Indirabhai |
| 7,656,751 | B2 | 2/2010 | Rischar et al. |
| 7,750,685 | B1 | 7/2010 | Bunch et al. |
| 7,904,713 | B1 | 3/2011 | Zajkowski et al. |
| 7,941,684 | B2 | 5/2011 | Serebrin et al. |
| 8,065,052 | B2 | 11/2011 | Fredriksson et al. |
| 8,341,454 | B1 | 12/2012 | Kondapalli |
| 8,370,675 | B2 | 2/2013 | Kagan |
| 8,407,478 | B2 | 3/2013 | Kagan et al. |
| 8,607,086 | B2 | 12/2013 | Cullimore |
| 8,699,406 | B1 | 4/2014 | Charles et al. |
| 8,879,552 | B2 | 11/2014 | Zheng |
| 8,930,647 | B1 | 1/2015 | Smith |
| 9,344,265 | B2 | 5/2016 | Karnes |
| 9,397,960 | B2 | 7/2016 | Arad et al. |
| 9,979,998 | B1 | 5/2018 | Pogue et al. |
| 10,027,601 | B2 | 7/2018 | Narkis et al. |
| 10,054,977 | B2 | 8/2018 | Mikhaylov et al. |
| 10,164,759 | B1* | 12/2018 | Volpe .................. H04J 3/0697 |
| 10,320,646 | B2 | 6/2019 | Mirsky et al. |
| 10,637,776 | B2 | 4/2020 | Iwasaki |
| 10,727,966 | B1* | 7/2020 | Izenberg ............. H04J 3/0667 |
| 2001/0006500 | A1 | 7/2001 | Nakajima et al. |
| 2002/0027886 | A1 | 3/2002 | Fischer et al. |
| 2004/0096013 | A1 | 5/2004 | Laturell et al. |
| 2004/0153907 | A1 | 8/2004 | Gibart |
| 2005/0033947 | A1 | 2/2005 | Morris et al. |
| 2005/0268183 | A1 | 12/2005 | Barmettler |
| 2006/0109376 | A1 | 5/2006 | Chaffee et al. |
| 2007/0008044 | A1 | 1/2007 | Shimamoto |
| 2007/0072451 | A1 | 3/2007 | Tazawa et al. |
| 2007/0104098 | A1 | 5/2007 | Kimura et al. |
| 2007/0124415 | A1 | 5/2007 | Lev-Ran et al. |
| 2007/0159924 | A1 | 7/2007 | Vook et al. |
| 2007/0266119 | A1 | 11/2007 | Ohly |
| 2008/0069150 | A1 | 3/2008 | Badt et al. |
| 2008/0285597 | A1 | 11/2008 | Downey et al. |
| 2009/0257458 | A1 | 10/2009 | Cui et al. |
| 2010/0189206 | A1* | 7/2010 | Kagan ................. H04J 3/0697 375/354 |
| 2010/0280858 | A1 | 11/2010 | Bugenhagen |
| 2011/0182191 | A1 | 7/2011 | Jackson |
| 2012/0076319 | A1 | 3/2012 | Terwal |
| 2013/0045014 | A1 | 2/2013 | Mottahedin et al. |
| 2013/0215889 | A1 | 8/2013 | Zheng et al. |
| 2013/0294144 | A1 | 11/2013 | Wang et al. |
| 2013/0315265 | A1 | 11/2013 | Webb, III et al. |
| 2014/0185632 | A1 | 7/2014 | Steiner et al. |
| 2014/0253387 | A1 | 9/2014 | Gunn et al. |
| 2014/0321285 | A1 | 10/2014 | Chew et al. |
| 2015/0078405 | A1 | 3/2015 | Roberts |
| 2015/0127978 | A1* | 5/2015 | Cui ..................... H04J 3/0641 714/15 |
| 2015/0318941 | A1 | 11/2015 | Zheng et al. |
| 2016/0072602 | A1 | 3/2016 | Earl et al. |
| 2016/0110211 | A1 | 4/2016 | Karnes |
| 2016/0112182 | A1* | 4/2016 | Karnes .................... G06F 1/14 375/362 |
| 2016/0277138 | A1* | 9/2016 | Garg .................. H04L 41/0816 |
| 2016/0315756 | A1 | 10/2016 | Tenea et al. |
| 2017/0005903 | A1 | 1/2017 | Mirsky |
| 2017/0302392 | A1* | 10/2017 | Farra ..................... H04J 14/021 |
| 2017/0359137 | A1 | 12/2017 | Butterworth et al. |
| 2018/0059167 | A1 | 3/2018 | Sharf et al. |
| 2018/0152286 | A1* | 5/2018 | Kemparaj ............... H04L 7/041 |
| 2018/0191802 | A1* | 7/2018 | Yang ..................... H04L 1/0018 |
| 2018/0227067 | A1* | 8/2018 | Hu ........................ H04J 3/0641 |
| 2019/0014526 | A1 | 1/2019 | Bader et al. |
| 2019/0089615 | A1* | 3/2019 | Branscomb ............ H04L 69/22 |
| 2019/0149258 | A1 | 5/2019 | Araki et al. |
| 2019/0158909 | A1 | 5/2019 | Kulkarni et al. |
| 2019/0273571 | A1 | 9/2019 | Bordogna et al. |
| 2019/0319729 | A1 | 10/2019 | Leong et al. |
| 2019/0349392 | A1* | 11/2019 | Wetterwald ......... H04L 43/0852 |
| 2020/0304224 | A1 | 9/2020 | Neugeboren |
| 2020/0331480 | A1 | 10/2020 | Zhang et al. |
| 2020/0344333 | A1 | 10/2020 | Hawari et al. |
| 2020/0396050 | A1 | 12/2020 | Perras et al. |
| 2020/0401434 | A1 | 12/2020 | Thampi et al. |
| 2021/0218431 | A1 | 7/2021 | Narayanan et al. |
| 2021/0297230 | A1 | 9/2021 | Dror et al. |
| 2021/0318978 | A1 | 10/2021 | Hsung |
| 2022/0066978 | A1 | 3/2022 | Mishra et al. |

FOREIGN PATENT DOCUMENTS

| | | |
|---|---|---|
| EP | 1215559 B1 | 9/2007 |
| EP | 2770678 A1 | 8/2014 |
| JP | 2011091676 A | 5/2011 |
| WO | 2012007276 A1 | 1/2012 |
| WO | 2013124782 A2 | 8/2013 |
| WO | 2013143112 A1 | 10/2013 |
| WO | 2014029533 A1 | 2/2014 |

OTHER PUBLICATIONS

Lu et al., "A Fast CRC Update Implementation", Computer Engineering Laboratory, Electrical Engineering Department, pp. 113-120, Oct. 8, 2003.

Dlugy-Hegwer et al., "Designing and Testing IEEE 1588 Timing Networks", Symmetricom, pp. 1-10, Jan. 2007.

Mellanox Technologies, "How to test 1PPS on Mellanox Adapters", pp. 1-6, Oct. 22, 2019 downloaded from https://community.mellanox.com/s/article/How-To-Test-1PPS-on-Mellanox-Adapters.

IEEE Standard 1588™—2008: "IEEE Standard for a Precision Clock Synchronization Protocol for Networked Measurement and Control Systems", IEEE Instrumentation and Measurement Society, Revision of IEEE Standard 1588-2002, USA, pp. 1-289, Jul. 24, 2008.

Weibel et al., "Implementation and Performance of Time Stamping Techniques", 2004 Conference on IEEE 1588, pp. 1-29, Sep. 28, 2004.

Working Draft Project American National Standard T10/1799-D, "Information Technology—SCSI Block Commands—3 (SBC-3)", pp. 1-220, Revision 19, May 29, 2009.

"Infiniband Architecture: Specification vol. 1", pp. 1-1727, Release 1.2.1, Infiniband Trade Association, Nov. 2007.

Mellanox Technologies, "Mellanox ConnectX IB: Dual-Port InfiniBand Adapter Cards with PCI Express 2.0", pp. 1-2, USA, year 2008.

Gaist et al., U.S. Appl. No. 16/199,312, filed Nov. 26, 2018.

Levi et al., U.S. Appl. No. 16/779,611, filed Feb. 2, 2020.

Wikipedia—"Precision Time Protocol", pp. 1-8, Aug. 24, 2019.

IEEE Std 1588-2002, "IEEE Standard for a Precision Clock Synchronization Protocol for Networked Measurement and Control Systems", IEEE Instrumentation and Measurement Society, pp. 1-154, Nov. 8, 2002.

(56) References Cited

OTHER PUBLICATIONS

ITU-T recommendation, "G.8273.2/Y.1368.2—Timing characteristics of telecom boundary clocks and telecom time slave clocks", pp. 1-50, Jan. 2017.
Texas Instruments, "LMK05318 Ultra-Low Jitter Network Synchronizer Clock With Two Frequency Domains," Product Folder, pp. 1-86, Dec. 2018.
IPCLOCK, "IEEE 1588 Primer," ip-clock.com, pp. 1-3, May 1, 2017 (downloaded from https://web.archive.org/web/20170501192647/http://ip-clock.com/ieee-1588-primer/).
U.S. Appl. No. 16/900,931 Office Action dated Apr. 28, 2022.
U.S. Appl. No. 17/191,736 Office Action dated Apr. 26, 2022.
U.S. Appl. No. 16/779,611 Office Action dated Mar. 17, 2022.
U.S. Appl. No. 17/120,313 Office Action dated Mar. 28, 2022.
EP Application # 21214269 Search Report dated May 2, 2022.
U.S. Appl. No. 17/148,605 Office Action dated May 17, 2022.
"Precision Time Protocol," PTP Clock Types, CISCO, pp. 1-52, Jul. 30, 2020, as downloaded from https://www.cisco.com/c/en/us/td/docs/dcn/aci/apic/5x/system-management-configuration/cisco-apic-system-management-configuration-guide-52x/m-precision-time-protocol.pdf.
EP Application #22151451.6 Search Report dated Jun. 17, 2022.
U.S. Appl. No. 16/779,611 Office Action dated Jun. 24, 2022.
U.S. Appl. No. 17/120,313 Office Action dated Aug. 29, 2022.

\* cited by examiner

CLOCK SYNCHRONIZATION

RELATED APPLICATION

The present application claims priority from U.S. Provisional Patent Application Ser. 62/768,920 of Almog et al, filed 18 Nov. 2018.

FIELD OF THE INVENTION

The present invention relates in general to time distribution, particularly but not exclusively to time distribution in virtual environments, and further particularly but not exclusively to PTP distribution in virtual environments.

BACKGROUND OF THE INVENTION

Precision Time Protocol (PTP), which is defined inter alia, in IEEE 1588-2002 and in IEEE 1588-2008, is a protocol useful for synchronizing clocks in a computer network. The mention of particular IEEE documents is not intended to be limiting; it is anticipated that exemplary embodiments of the present invention will also be useful in other contexts, including but not limited to future versions of IEEE 1588.

SUMMARY OF THE INVENTION

The present invention, in certain embodiments thereof, seeks to provide an improved system for time synchronization (particularly but not exclusively for PTP time synchronization), suitable particularly, but not exclusively, for PTP distribution in virtual environments.

There is thus provided in accordance with an exemplary embodiment of the present invention apparatus including a shared device in communication with a plurality of computing machines external to the shared device, the shared device including at least one PTP domain coefficient storage area, the at least one PTP domain coefficient storage area receiving a PTP coefficient from a computing machine having a PTP client, and providing the PTP coefficient to a computing machine not having a PTP client.

Further in accordance with an exemplary embodiment of the present invention the computing machine not having a PTP client includes a plurality of computing machines not having a PTP client.

Still further in accordance with an exemplary embodiment of the present invention each computing machine includes a virtual machine.

Additionally in accordance with an exemplary embodiment of the present invention upon receiving a PTP coefficient from a computing machine having a PTP client, the shared device sends an update event to a computing machine not having a PTP client.

Moreover in accordance with an exemplary embodiment of the present invention upon receiving a PTP coefficient from a computing machine having a PTP client, the shared device sends an update event to each computing machine not having a PTP client.

Further in accordance with an exemplary embodiment of the present invention at least one computing machine having a PTP client is in communication with a PTP grandmaster external thereto.

There is also provided in accordance with another exemplary embodiment of the present invention a method including providing a shared device in communication with a plurality of computing machines external to the shared device, the shared device including at least one PTP domain coefficient storage area, the at least one PTP domain coefficient storage area receiving a PTP coefficient from a computing machine having a PTP client, and the at least one PTP domain coefficient storage area providing the PTP coefficient to a computing machine not having a PTP client.

Further in accordance with an exemplary embodiment of the present invention the computing machine not having a PTP client includes a plurality of computing machines not having a PTP client.

Still further in accordance with an exemplary embodiment of the present invention each computing machine includes a virtual machine.

Additionally in accordance with an exemplary embodiment of the present invention upon receiving a PTP coefficient from a computing machine having a PTP client, the shared device sends an update event to a computing machine not having a PTP client.

Moreover in accordance with an exemplary embodiment of the present invention upon receiving a PTP coefficient from a computing machine having a PTP client, the shared device sends an update event to each computing machine not having a PTP client.

Further in accordance with an exemplary embodiment of the present invention at least one computing machine having a PTP client is in communication with a PTP grandmaster external thereto.

There is also provided in accordance with another exemplary embodiment of the present invention apparatus including shared means for communicating with a plurality of computing machines external to the shared means, and at least one PTP domain coefficient storage means, the at least one PTP domain coefficient storage means receiving a PTP coefficient from a computing machine having a PTP client, and providing the PTP coefficient to a computing machine not having a PTP client.

BRIEF DESCRIPTION OF THE DRAWINGS

The present invention will be understood and appreciated more fully from the following detailed description, taken in conjunction with the drawings in which.

DETAILED DESCRIPTION OF AN EMBODIMENT

In the context of providing/distributing time synchronization (of which PTP is one particular non-limiting example, used herein for simplicity of description and without limiting the generality of the present invention) in virtual environments, the inventors of the present invention believe that in currently known systems a PTP slave is used per virtual machine (VM) (virtual machines being used by way of non-limiting example, it being appreciated that a computing machine which is not a virtual machine may alternatively be used). The PTP slave synchronizes the relevant time on the virtual machine, where the PTP slave runs based on synchronization (directly or indirectly via a PTP master) to a PTP grandmaster clock. When using PTP in a virtual machine environment in such a way, the inventors of the present invention believe that there are several drawbacks at least:

1. Each PTP client generates its own PTP traffic which causes load on the network and on the PTP grandmaster server, especially when there is a large number of VMs. Furthermore, the PTP grandmaster is limited in the amount of PTP clients that can be supported.

2. Generally speaking, a given physical device (computer) on which a plurality of virtual machines are instantiated usually has a single hardware (HW) clock and hence only a single PTP client can use the HW clock, while the rest of the PTP clients use a software (SW) clock which is less accurate.

In exemplary embodiments, as described herein, one or more of the following advantages may be obtained:

1. Security is enhanced, as various virtual machines do not communicate directly (compare to the situation shown in FIG. 4).

2. Efficiency is enhanced, since the PTP master need not update every PTP client (again, compare to the situation shown in FIG. 4).

3. Ease of management is enhanced, since each PTP client registers to the same place, and need not find an appropriate PTP master to which to register.

Figure 4:
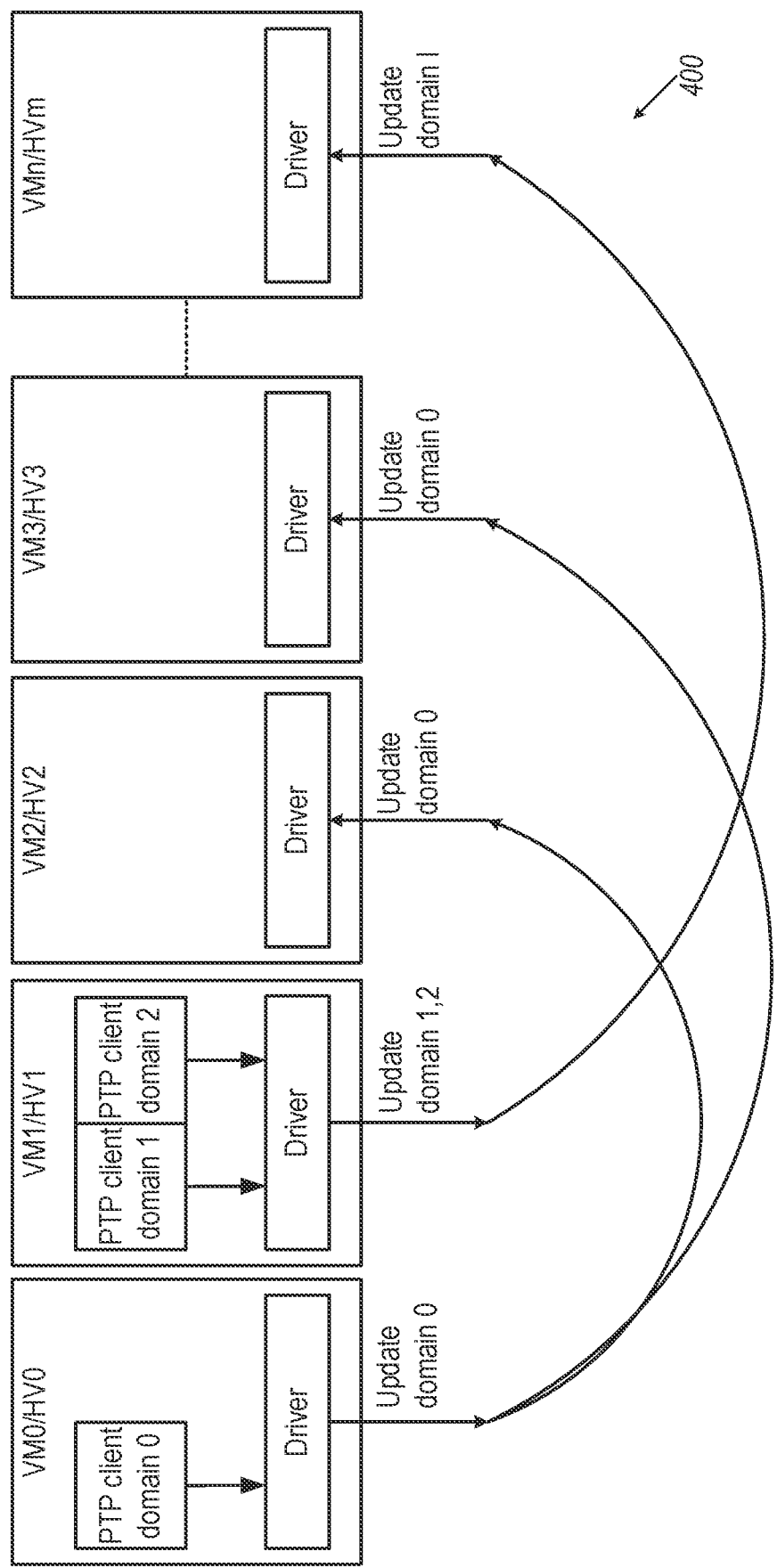
FIG. 4 is a simplified pictorial illustration of a system for PTP distribution, in accordance with certain exemplary embodiments of the present invention.

A general view of a system in accordance with such exemplary embodiments, as described in more detail below, is shown in FIG. 4, and generally designated 400.

Figure 1:
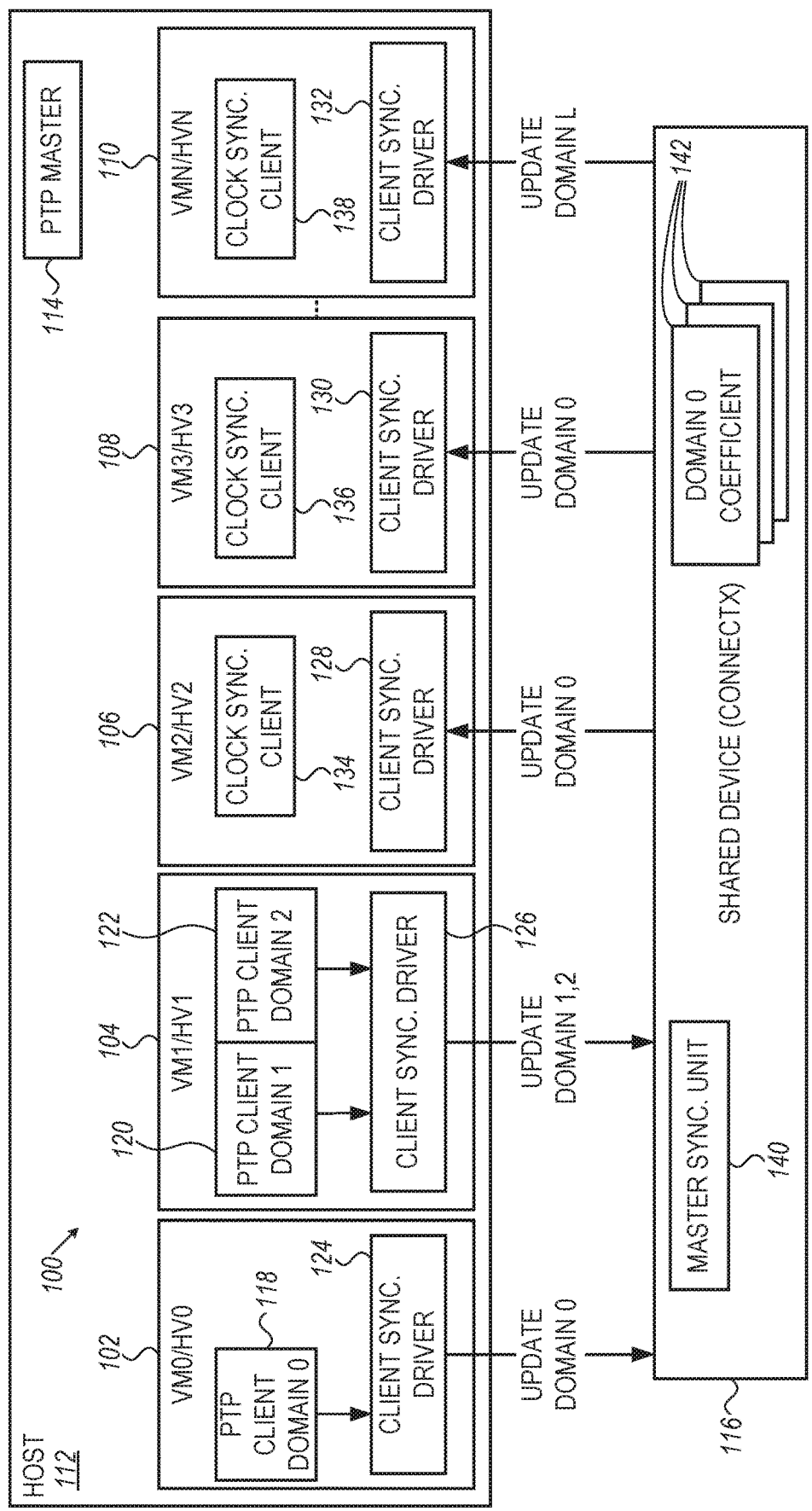
FIG. 1 is a simplified pictorial illustration of a system for PTP distribution, constructed and operative in accordance with an exemplary embodiment of the present invention.

Reference is now made to FIG. 1, which is a simplified pictorial illustration of a system, generally designated 100, for PTP distribution, constructed and operative in accordance with an exemplary embodiment of the present invention. FIG. 1 depicts a plurality of virtual machines/hypervisor machines (shown, for simplicity of illustration, as VM0/HV0 102, VM1/HV1 104, VM2/HV2 106, VM3/HV3 108, . . . and VMn/HVn 110; it being appreciated that a larger or smaller plurality of virtual machines may be used). As is known in the art, virtual machines are implemented on a physical computer comprising one or more processors, memory, and other hardware that generally is present in physical computers. Each virtual machine is generally set up and controlled using a hypervisor or virtual machine monitor which provides resources to each virtual machine (these being HV0 . . . HVn, as also referred to above, in FIG. 1; it being appreciated that a larger or smaller plurality of hypervisors may be used).

It is appreciated that, as is known in the art, each of VM0/HV0 102, VM1/HV1 104, VM2/HV2 106, VM3/HV3 108, . . . and VMn/HVn 110 is instantiated within a host device 112 (shown as a single host device 112, although it is appreciated that, in alternative exemplary embodiments, more than one host device may be used, with each host device having one or a plurality of virtual machines); the host device 112 fills the role of the physical computer as described above.

The host device 112 includes a PTP master 114, which may be in communication with a PTP grandmaster (not shown) external to the system of FIG. 1.

FIG. 1 also depicts a shared device 116, which may be, by way of non-limiting example, a shared memory area accessible by the VMs (e.g. memory area associated with the host machine that is running the VMs) or a ConnectX device commercially available from Mellanox Technologies, Ltd. Particular non-limiting examples of such devices, which comprise processor/s and memory, and which would generally be modified in firmware and/or software to implement exemplary embodiments of the present invention include: ConnectX-4; ConnectX-5; and ConnectX-6. As depicted in FIG. 1, the shared device 116 includes a master synchronization unit 140 and a plurality of domain coefficient storage areas 142.

An exemplary mode of operation of the system of FIG. 1 is now briefly described.

Certain of the virtual machines shown in FIG. 1 (by way of particular non-limiting example, VM0/HV0 102 and VM1/HV1 104) each run one or more PTP clients (118, 120, 122). Each of the virtual machines shown in FIG. 1 (VM0/HV0 102, VM1/HV1 104, VM2/HV2 106, VM3/HV3 108, . . . and VMn/HVn 110) includes a client synchronization driver (reference numerals 124, 126, 128, 130, and 132 respectively). The virtual machines shown in FIG. 1 (by way of particular non-limiting example, VM2/HV2 106, VM3/HV3 108, and VMn/HVn 110) which do not run one or more PTP clients each run a clock synchronization client (reference numerals 134, 136, and 138 respectively). Domain 0 PTP client 118 sends PTP coefficient parameters, via the client synchronization driver 124, to a domain coefficient storage area 142 for domain 0. PTP coefficient parameters comprise, for example, frequency "delta" for clock frequency correction, and "offset" for adjustment of time indication.

Similarly, domain 1 PTP client 120 and domain 2 PTP client 122 send PTP coefficient parameters, via the client synchronization driver 126, to a domain coefficient storage area 142 for domains 1 and 2, respectively. Then, each clock synchronization client 134, 136, and 138 receives PTP coefficient parameters for its time domain via the respective client synchronization driver 128, 130, 132 from the appropriate coefficient storage area 142 for the appropriate PTP domain. By way of non-limiting example, it is appreciated that a given PTP domain might represent PTP time for a given time zone.

The drawbacks mentioned above may be overcome by using the system of FIG. 1, in which communication channel between the virtual machines running a PTP client (depicted in FIG. 1 as VM0/HV0 102 and VM1/HV1 104) and other virtual machines which are not running a PTP client (depicted in FIG. 1 as VM2/HV2 106, VM3/HV3 108, . . . , VMn/HVn 110); those virtual machines which do not run a PTP client use the PTP coefficient parameters computed by a virtual machine that runs the PTP client, and obtain those parameters via the shared device 116, as described above. The necessity of (possibly a large number of) direct connections, as shown in FIG. 4, is thus obviated.

Figure 2:
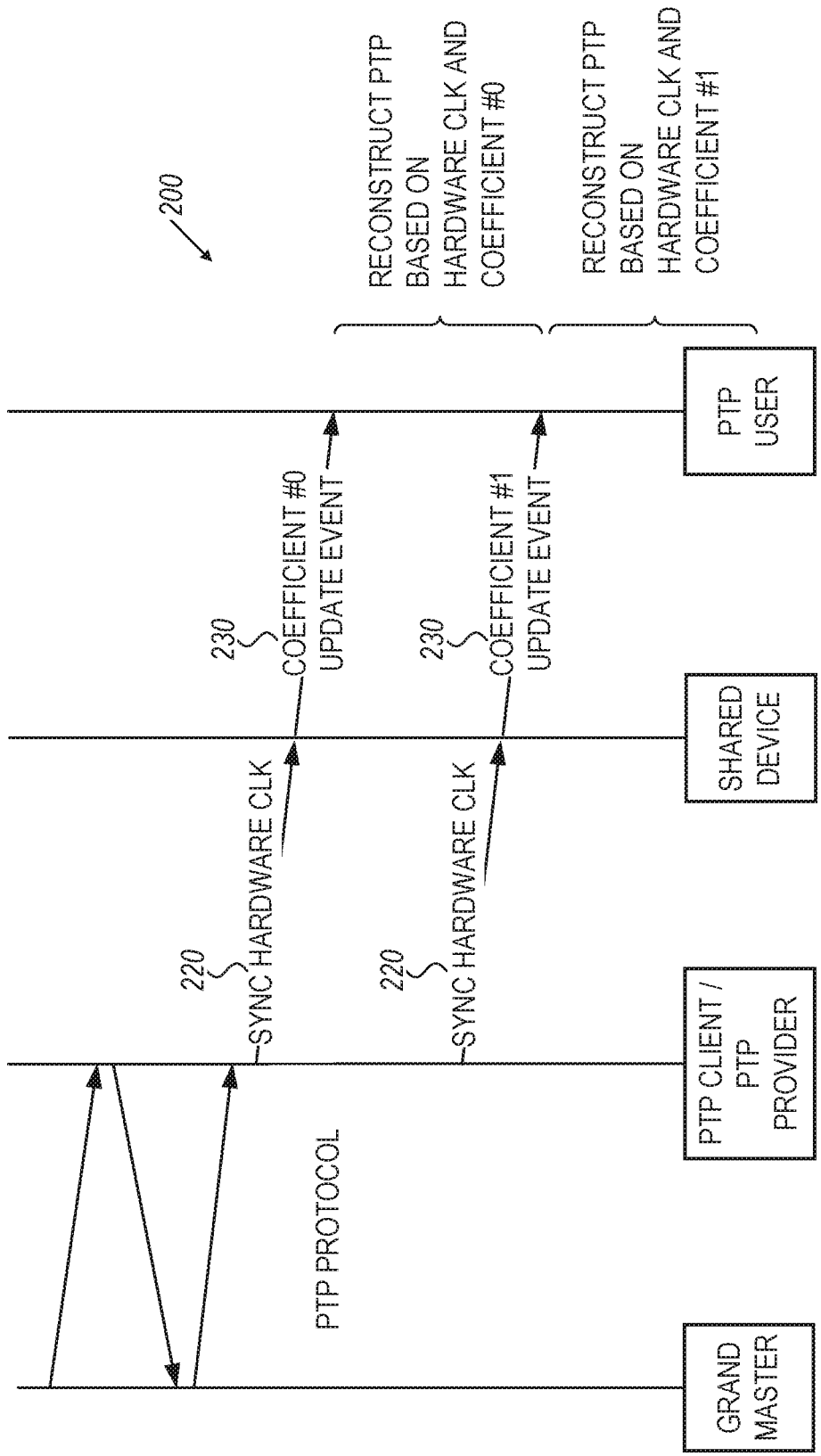
FIG. 2 is a simplified flow illustration of an exemplary method of operation of the system of FIG. 1.

Reference is now additionally made to FIG. 2, which is a simplified flow illustration (generally designated 200) of an exemplary method of operation of the system of FIG. 1.

A shared memory (e.g., shown in FIG. 1 as comprised in a memory unit associated with the VMs or in the shared device 116 (ConnectX), comprising reference numerals 140 and 142) contains a master synchronization unit and an array of coefficient parameters per PTP domain. Each virtual machine that runs a PTP client registers itself (from the associated driver to a master synchronization unit on the shared device) as a PTP domain provider (time provider). Each virtual machine which requires PTP synchronization but does not itself run a PTP client registers itself (using a client synchronization driver, as described above) to one of the PTP domains as a clock synchronization client ("PTP user" in FIG. 2). As appropriate, deregistration may occur similarly, including by using mechanisms for registration and deregistration that are well-known and are not part of the scope of exemplary embodiments of the present invention.

A PTP domain is a network (or a portion of a network) within which PTP operates, or a network within which all of the clocks are in sync. A single computer network can have multiple PTP domains operating separately, e.g., one set of clocks synchronized to a first time scale and another set of clocks synchronized to a second time scale. PTP can run over Ethernet or UDP/IP, thus a domain may correspond to a local area network or may extend across a wide area network.

When a PTP client/provider's clock (for example, PTP clock) is updated, it updates (reference numeral 220) the driver for the virtual machine on which that client/provider runs, and the shared memory is also updated by the master synchronization unit (which may, e.g., may be implemented in firmware, hardware or software) that then runs with the new coefficient parameters. Once the shared memory is updated, an update event (reference numeral 230) to all clock synchronization clients of the domain is generated by the master synchronization unit. The clock synchronization client driver updates PTP timestamp (TS) and provides appropriate timing (generally world clock timing, such as, by way of non-limiting example: UTC; TAI; GPS; or another appropriate timing), according to the coefficient parameters provided by the time provider. The clock synchronization client updates its coefficient parameters, typically each time an update event is received.

More specifically, the update is done from the time providers to the clock synchronization clients. The update event generally includes appropriate adjustment-relevant information (also referred to herein and in the drawings as "coefficient") and allows the clock synchronization clients to adjust the time (such as PTP time) according to their respective domains. For example, such an update event may include an adjustment offset and a frequency offset from a domain's hardware clock, which will allow a clock synchronization client to reconstruct PTP time from hardware time.

Update process: A PTP client on the time provider machine synchronizes to the PTP grandmaster using PTP protocol, such synching being a well-known PTP process. Once the PTP client updates the hardware clock in accordance with the PTP time thus obtained, the shared device (as also mentioned above) generates an update event to the clock synchronization clients, announcing the update. In exemplary embodiments, the clock synchronization clients use the most updated coefficient parameters available to them in order to translate the hardware clock time available to them to PTP format.

Figure 3:
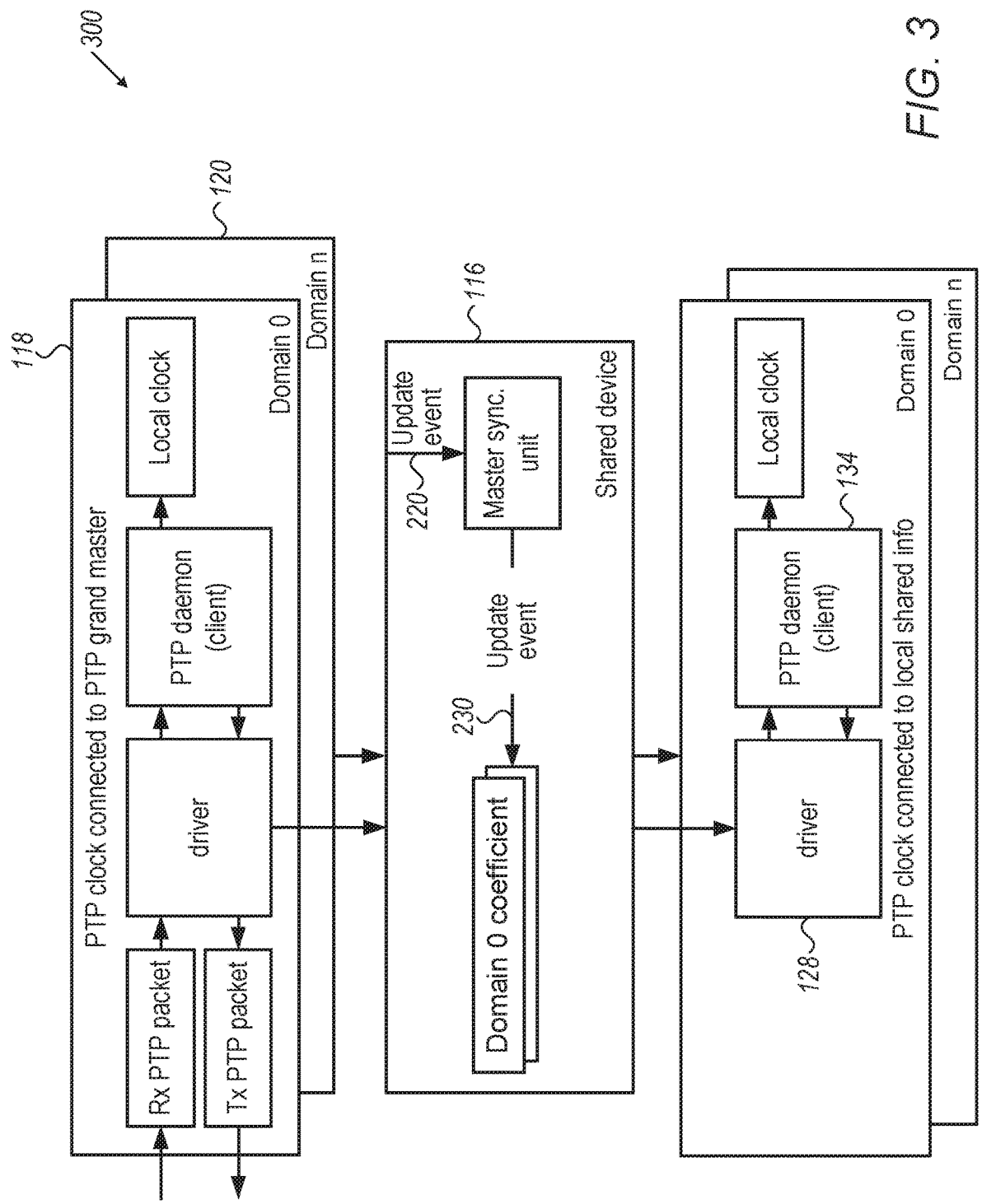
FIG. 3 is an alternative view of the simplified flow illustration of FIG. 2.

Reference is now additionally made to FIG. 3, which is an alternative view of the simplified flow illustration of FIG. 2. The flow illustration of FIG. 3, generally designated 300, shows how the flow illustrated in FIG. 2 relates, in an exemplary embodiment, to the exemplary system of FIG. 1, and will be understood with reference to the above description of FIG. 2.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove.

What is claimed is:

1. An apparatus comprising:
   a shared device in communication with a plurality of computing machines external to the shared device, each of said plurality of computing machines comprising a virtual machine, each said virtual machine comprising a client synchronization driver, the shared device comprising a plurality of PTP (Precision Time Protocol) domain coefficient storage areas,
   said virtual machines comprising:
      at least one virtual machine having a PTP client to register as a provider for at least one PTP time domain of a plurality of PTP time domains, and
      at least one virtual machine not having a PTP client to register to one of said PTP time domains as a clock synchronization client,
   at least one of said PTP domain coefficient storage areas:
      1) receiving a PTP coefficient associated with clock frequency correction and/or adjustment of time indications, from said at least one virtual machine having a PTP client, and, 2) providing said PTP coefficient associated with clock frequency correction and/or adjustment of time indications, to said at least one virtual machine not having a PTP client, wherein said clock synchronization client receives said PTP coefficient associated with said clock frequency correction and/or adjustment of time indications, for the PTP time domain of said clock synchronization client, via the respective client synchronization driver,
   wherein, upon said at least one virtual machine not having a PTP client receiving said PTP coefficient from said at least one virtual machine having a PTP client, the shared device sends an update event to said at least one virtual machine not having a PTP client.

2. The apparatus according to claim 1 and wherein said at least one virtual machine not having a PTP client comprises a plurality of virtual machines not having a PTP client.

3. The apparatus according to claim 2, and wherein, upon receiving a PTP coefficient from said virtual machine having a PTP client, the shared device sends an update event to each said virtual machine not having a PTP client.

4. The apparatus according to claim 1, and wherein said at least one virtual machine having a PTP client is in communication with a PTP grandmaster external thereto.

5. A method comprising:
   providing a shared device in communication with a plurality of computing machines external to the shared device, each of said plurality of computing machines comprising a virtual machine, each said virtual machine comprising a client synchronization driver, the shared device comprising a plurality of PTP (Precision Time Protocol) domain coefficient storage areas,
   said virtual machines comprising:
      at least one virtual machine having a PTP client to register as a provider for at least one PTP time domain of a plurality of PTP time domains, and
      at least one virtual machine not having a PTP client to register to one of said PTP time domains as a clock synchronization client, at least one of said PTP domain coefficient storage areas receiving a PTP coefficient associated with clock frequency correction and/or adjustment of time indications, from said at least one virtual machine having a PTP client; and at least one of said PTP domain coefficient storage areas providing said PTP coefficient associated with clock frequency correction and/or adjustment of time indications, to said at least one virtual machine not having a PTP client, wherein said clock synchronization client receives said PTP coefficient associated with said clock frequency correction and/or adjustment of time indications, for the PTP time domain of said clock synchronization client, via the respective client synchronization driver, wherein, upon said at least one virtual machine not having a PTP client receiving said PTP coefficient from said at least one virtual machine having a PTP client, the shared device sends an update event to said at least one virtual machine not having a PTP client.

6. The method according to claim 5 and wherein said at least one virtual machine not having a PTP client comprises a plurality of virtual machines not having a PTP client.

7. The method according to claim 6, and wherein, upon receiving a PTP coefficient from said at least one virtual machine having a PTP client, the shared device sends an update event to each said virtual machine not having a PTP client.

8. The method according to claim 5, and wherein said at least one virtual machine having a PTP client is in communication with a PTP grandmaster external thereto.

9. An apparatus comprising:
shared means for communicating with a plurality of computing machines external to the shared means, said plurality of computing machines comprising respective virtual machines, each virtual machine comprising a client synchronization driver; and a plurality of PTP (Precision Time Protocol) domain coefficient storage means, said virtual machines comprising:
at least one virtual machine having a PTP client to register as a provider for at least one PTP time domain of a plurality of PTP time domains, and at least one virtual machine not having a PTP client to register to one of said PTP time domains as a clock synchronization client, at least one of said PTP domain coefficient storage means:
1) receiving a PTP coefficient associated with clock frequency correction and/or adjustment of time indications, from said at least one virtual machine having a PTP client, and, 2) providing said PTP coefficient associated with clock frequency correction and/or adjustment of time indications, to said at least one virtual machine not having a PTP client, wherein said clock synchronization client receives said PTP coefficient associated with said clock frequency correction and/or adjustment of time indications, for the PTP time domain of said clock synchronization client, via the respective client synchronization driver, wherein, upon said at least one virtual machine not having a PTP client receiving said PTP coefficient from said at least one virtual machine having a PTP client, the shared means sends an update event to said at least one virtual machine not having a PTP client.

* * * * *